United States Patent [19]

Peterson

[11] 4,382,471

[45] May 10, 1983

[54] LOW DAMAGE BEET CLEANER AND ELEVATOR

[75] Inventor: Charles L. Peterson, Moscow, Id.

[73] Assignee: Idaho Research Foundation, Inc., Moscow, Id.

[21] Appl. No.: 307,765

[22] Filed: Oct. 2, 1981

[51] Int. Cl.³ ............................................. A01D 33/02
[52] U.S. Cl. ..................................... 171/124; 56/16.4; 56/16.5; 209/6.7
[58] Field of Search ......................... 171/124, 126, 26; 56/16.4, 16.5, 16.6; 209/617

[56] References Cited

U.S. PATENT DOCUMENTS

| | | |
|---|---|---|
| 799,911 | 9/1905 | Lofstam . |
| 956,821 | 5/1910 | Nix ..................................... 171/124 |
| 1,753,874 | 2/1928 | Taylor . |
| 2,369,723 | 2/1945 | Denlinger . |
| 2,388,740 | 11/1945 | Harwood . |
| 3,190,329 | 6/1965 | Bradway . |
| 4,284,145 | 8/1981 | Small ................................... 171/126 |

*Primary Examiner*—Jay N. Eskovitz
*Attorney, Agent, or Firm*—Wells, St. John & Roberts

[57] ABSTRACT

A low damage beet cleaner and elevator for a beet harvester is described. Beets are lifted elevationally between a lugged, endless elevator draper and an endless, upwardly inclined belt having flexible, finger-like projections. The draper and the belt are driven through their respective circuits with the belt being driven at a speed faster than that of the draper. The speed differential between the belt and the draper causes the finger-like projections to flexibly engage with the beets producing a brushing effect on the beets to clean them while they are being elevated for loading.

6 Claims, 4 Drawing Figures

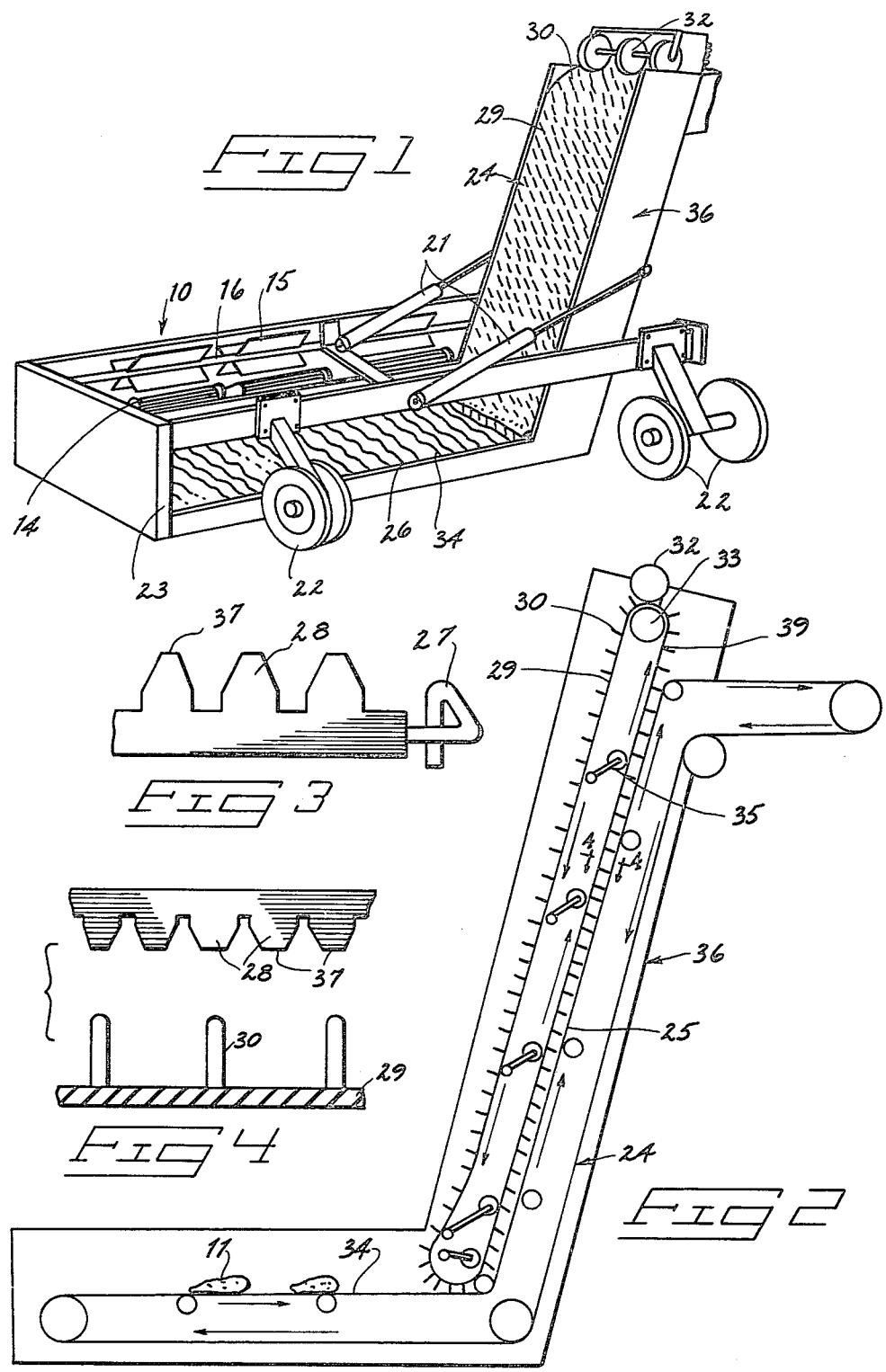

LOW DAMAGE BEET CLEANER AND ELEVATOR

TECHNICAL FIELD

The present invention relates to the harvesting of sugar beets.

BACKGROUND ART

Like other perishable agricultural commodities, sugar beets deteriorate in storage. The general estimate is that beets lose about one half pound of sugar per ton per day of storage, or fifty pounds of sugar per ton of beets during a 100 day storage period.

When sugar is 12¢ per pound, this loss amounts to $6.00 per ton for the 100 day storage period. If average yield is 20 tons per acre and growers receive 60% of the value of the sugar, then the loss amounts to $72 per acre to the grower, $48 per acre to the processor.

Although storage losses can never be totally eliminated, they can be reduced by careful harvesting and handling. This is true even when beets are to be processed immediately after harvesting. Sugar losses are high initially, decrease gradually as the beets are held in storage, and then gradually increase towards the end of the storage period.

A series of studies were conducted by the University of Idaho and cooperators in 1975 and 1976 to determine the extent of injuries to sugar beets during harvesting and handling, and the affect these injuries have on sugar losses. Mechanical damage was evaluated by several methods—by measuring sucrose and impurities in storage, by measuring respiration, and by visual assessment. These studies have helped to point out the problem areas where mechanical injury is most severe.

The University work clearly demonstrates that handling systems now in use severely damage beets, resulting in high sugar losses during storage. In a 1975-76 storage study, beets that were untopped, hand-harvested, damage free, and treated with a fungicide lost less than 0.13 pound sugar/ton/day during 140 days in an environmental storage chamber. Beets that had been mechanically harvested, piled with conventional equipment, and treated with a fungicide lost 0.4 pound/sugar/ton/day; mechanically harvested piled beets without the fungicide treatment lost 1.1 pound/sugar/ton/day.

Damage levels increase at each step of the handling system. By the time beets are in the storage pile, each beet will have several damaged areas.

Preliminary studies suggest that some harvesters damage beets more than others. The difference is most likely caused by the cleaning systems. Machines that use steel rinks and star wheels damage beets more severely than harvesters that use grab rolls. In general, the more cleaning rollers and rinks, the more damage to the beets. Lifter loader harvesters show increased damage to roots taken off the cleaning screens and another increase as roots go into the truck. Tank type harvesters increase damage as the roots are cleaned and elevated to the tank. Damage is also different between the top and bottom of the tank. The lifter loader machine is inherently a lower damage machine than the tank type because the roots are handled less.

For normal conditions, all harvesters do a good job of removing dirt. However, tare studies indicate that harvester cleaning actually isn't needed except to reduce the amount of dirt carried to and from the piling ground.

About one third of the damage during harvesting occurs on the cleaning screen and lifting wheels, another third while moving the beets from the harvester to the truck, and the final third while moving them from the truck to the pile.

The three chief causes of damage to roots while harvesting and handling are: (1) dropping or throwing the roots; (2) striking or scraping the roots with the moving part of the machine; (3) handling the beets when they are cold.

Since the beet harvest occurs late in the fall and the harvest time is limited by weather, stopping harvest because of low temperatures generally is not feasible. However, mechanical systems can be improved to reduce damage.

Changes in equipment occur very slowly. Manufacturers are reluctant to make investments in new systems because the total sales of sugar beet handling equipment is very low. A new improvement in existing sugar beet harvesting machinery that would reduce injury to the beets while maintaining harvester cleaning ability and volume is much needed by the sugar beet industry.

DISCLOSURE OF INVENTION

The present invention provides a low damage beet cleaner and elevator. The beets are carried on an endless elevator draper having an upwardly inclined delivery flight. The draper includes a pair of parallel side chains. Bars are connected between the side chains transverse to the direction of draper travel; protruding lugs are arranged on an outward surface of the bars between the side chains and transverse to the direction of draper travel. The lugs are shaped into scraper points for cleaning the crevices of the beets.

The beets are lifted between the draper and an endless upwardly inclined belt. The belt has flexible, finger-like projections and bears against the delivery flight of the draper to elevationally lift the beets between the belt and the draper.

A drive mechanism is connected to the elevator draper and the endless belt to drive the draper to the belt through their respective circuits. The belt is driven at a speed faster than that of the draper. The speed differential between the belt and the draper flexibly engages the finger-like projections on the belt with the beets and produces a brushing effect on the beets to clean them while they are being elevated for loading.

BRIEF DESCRIPTION OF DRAWINGS

A preferred embodiment of the invention is illustrated in the accompanying drawings in which:

FIG. 1 is a schematic drawing of a beet harvester;

FIG. 2 is a cutaway of a low damage beet cleaner and elevator;

FIG. 3 is a detail of the draper lugs; and

FIG. 4 is a sectional view through line 4—4 in FIG. 2.

BEST MODE FOR CARRYING OUT THE INVENTION

My invention is a low damage beet cleaner and elevator. It may be incorporated into the mechanism of the existing beet harvester as an improvement to reduce beet damage due to harvesting or it may be included as a feature in newly designed beet harvesters.

Studies at the University of Idaho and elsewhere have shown that sugar beet injury increases beet respiration rates and accelerates deterioration in storage. Point-to-point studies have shown that damage occurs at each step of the handling operation including field harvesting. While the industry is aware of the loss due to beet damage during handling, serious attempts to actually reduce damage have been lacking.

A sugar beet harvester is essentially three components: (1) lifting wheels, (2) cleaning components, and (3) an elevator. The beets need to be lifted from the ground, cleaned of dirt and trash, and elevated to heights sufficient to be placed into a truck. Previous University of Idaho harvester work has shown severe damage occurring in cleaning because of the sharp kicker wheels or the high speed grab rolls used in most harvesters; during elevating because of the steel chains, sharp edges flights, and sliding beets against rough steel edges; and in dropping the beets into the truck.

Most cleaning systems rely on bouncing or rolling the beets to remove the dirt through impact. In the past, reducing damage has given way to designing the harvester for volume. The present invention gives priority to minimizing damage.

The following basic concepts illustrate the philosophy of the present invention: (1) remove all sharp points and edges where the beets can be damaged, carry the beets on rubber whenever possible; (2) clean with a brushing action, avoid impact; (3) elevate the beets on rubber surfaces.

The present invention incorporates each of these concepts into a commercially manufactured harvester such as the four-row lifter-loader machine manufactured by the Lockwood Manufacturing Company. In this harvester 10 (FIG. 1), the beets 11 are lifted with lifter wheels (not shown) and pushed with rubber kickers (not shown) onto a rubber covered primary elevator chain 14. A separate chain is used for each row of beets.

In the present invention the machine was modified to harvest three rows at a time so that it could be used with six or twelve row planters. The primary chain 14 carries the beets steeply away from the lifter wheels. Rubber fins 15 attached radially to a rotating shaft 16 above the primary elevator prevent the beets from rolling back into the lifter wheels. From the primary chain the beets fall across two four-inch trash rolls (not shown), one smooth and one with a spiral scroll. The trash rolls remove some dirt and most of the leaves and weeds that are lifted with the beets.

The harvester 10 is easily moved through the field for harvesting on wheels 22 attached to the harvester frame 23. For transport from field to field, the harvester may be folded by the hydraulic fold up mechanism 21.

The present invention (FIG. 2)—a low damage beet cleaner and elevator—combines cleaning and elevating into a single operation, reducing damage to the beets. The invention includes an endless elevator draper 24. The draper has a horizontal flight 34 and an upwardly inclined delivery flight 25.

The draper 24 consists of parallel side chains 26 that are driven about a circuit including the horizontal flight 34 and the delivery flight 35. Bars 27 are connected between the parallel side chains 26, and are arranged transverse to the direction of draper 24 travel. Protruding lugs 28 (FIG. 3) are arranged on an outward surface of the bars 27 transverse to the direction of draper travel.

An endless, upwardly inclined belt 29 travels about a circuit similar to that of the draper delivery flight 24 and has a belt working flight 39 parallel to the draper delivery flight 24. The belt has flexible finger-like projections 30 arranged along its outer surface (FIG. 4).

Hold down rollers 35 tension the upwardly inclined belt 29 causing it to bear against the endless elevated draper delivery flight 25.

A drive means (not shown), such as an external motor is connected to a head pulley 33 through a series of pneumatic tires 32. The drive means operates the outwardly inclined belt 29 and the endless elevator draper 24 through their respective circuits.

In operation, the beets are loaded onto the draper horizontal flight 34 from the trash rolls. The beets are conveyed along the horizontal flight to the elevator 36. The draper 34 is coated with a heavy duty rubber covering to minimize beet damage. On the lugs 28 the rubber is molded into scraper points 37 on two-inch centers for cleaning the sutures of the beets.

Once the beets are conveyed to the elevator 36, they are lifted. The draper delivery flight 25 lifts the beets in conjunction with the upwardly inclined belt 29. The hold down rollers 35 press the upwardly inclined belt 29 to bear on the draper delivery flight 25 and vertical lift of the beets is achieved. The belt has rubber fingers on four-inch centers that run against the draper. The elevator is nearly vertical, approximately 75° from horizontal. There are five hold down rollers 35 to apply pressure to the beets between the belt and draper and aid in lifting the beets vertically.

The belt 29 is driven by small pneumatic tires 32 running against a head pulley 33. No tail pulley is used, which allows beets of essentially any size to enter the elevator. When the beets have reached the top of the elevator they are loaded into a truck.

The belt 29 is driven at a speed 25% faster than that of the draper 24. The speed differential between the belt 29 and the draper 24 rolls the beets inside the vertical elevator 36 while the belt finger-like projections 30 engage with the beets. The result is a brushing effect on the beets to clean them while they are being elevated for loading.

The foregoing describes the best mode for carrying out the present invention. The extent of the invention is to be limited only by the claims that follow.

I claim:

1. A low damage beet cleaner and elevator, comprising:
   an endless elevator draper having an upwardly inclined delivery flight, the draper including:
   (a) a pair of parallel side chains;
   (b) bars connected between the side chains transverse to the direction of draper travel;
   (c) protruding lugs shaped into scraper points for cleaning the crevices of the beets, said lugs being arranged on an outward surface of the bars between the side chains and transverse to the direction of draper travel;
   an endless, upwardly inclined belt having flexible, finger-like projections, said belt bearing against the delivery flight of the draper to elevationally lift the beets between the belt and the draper; and
   means operably connected to the elevator draper and the endless belt for driving the draper and the belt through their respective circuits, the belt being driven at a speed faster than that of the draper, whereby the speed differential between the belt and the draper flexibly engages the finger-like projections with the beets and produces a brushing effect on the beets to clean them while they are being elevated for loading.

2. A beet elevator as claimed in claim 1, wherein the elevator draper further comprises:
a horizontal flight for conveying beets received from a harvesting mechanism to the delivery flight.

3. A beet elevator as claimed in claim 2, wherein the horizontal flight and the delivery flight are each part of the endless draper.

4. A beet elevator as claimed in claim 1, further comprising:
hold down rollers positioned along a supporting framework to apply pressure to the beets between the belt and the draper whereby the beets are more surely lifted elevationally.

5. A beet elevator as claimed in claim 1, wherein the speed differential between the belt and the draper is such that the belt travels at a speed 25% faster than that of the draper.

6. A beet elevator as claimed in claim 1, wherein the finger-like projections are made of rubber and wherein the bars and lugs of the draper are covered with rubber.

* * * * *